Aug. 11, 1970            D. SINGLE            3,523,904
PROCESS FOR RECLAIMING CONTAMINATED PHOSPHORS
Filed Aug. 28, 1967
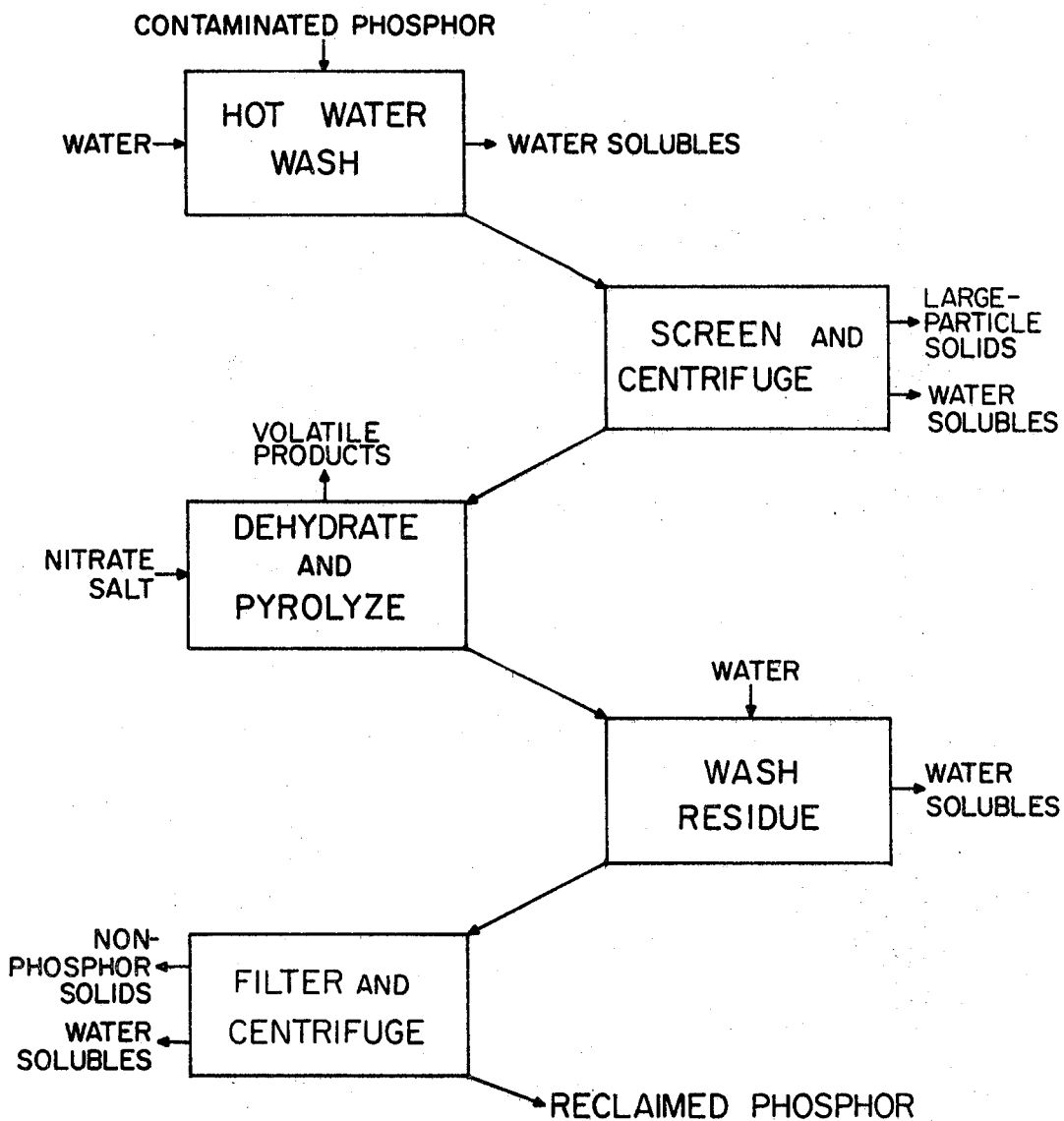
DAVID SINGLE
INVENTOR.

United States Patent Office 3,523,904
Patented Aug. 11, 1970

3,523,904
PROCESS FOR RECLAIMING CONTAMINATED PHOSPHORS
David Single, Chicago, Ill., assignor to Motorola, Inc., Franklin Park, Ill., a corporation of Illinois
Filed Aug. 28, 1967, Ser. No. 663,621
Int. Cl. C09k 1/04
U.S. Cl. 252—301.6    4 Claims

ABSTRACT OF THE DISCLOSURE

A contaminated phosphor slurry used in the manufacture of a color cathode ray tube is processed for reuse by a sequence of steps including pyrolysis at 1100° F. to 1200° F. with an alkali metal nitrate to volatilize certain impurities and convert other contaminants to a more readily separable form. The contaminated slurry or "sludge" is first subjected to a series of mildly acid, hot water washing operations followed by settling and decantation to remove water soluble contaminants prior to the pyrolysis step. The phosphor and the remaining water insoluble solids are thoroughly mixed with a concentrated aqueous solution of potassium nitrate. The mixture is then dehydrated at about 500° to 600° F., and subject to pyrolysis. The non-volatile residue is subjected to a mildly acid water wash, followed by settling and decantation similarly as before. Finally, the reclaimed phosphor is centrifuged and dried in preparation for reuse.

BACKGROUND

This invention relates to the slurry process for the manufacture of phosphor screens for color cathode ray tubes. More particularly, the invention is directed to a method for reclaiming a phosphor from a contaminated slurry, and from the scrapings which may be salvaged from the walls of the processing equipment.

In the slurry process, a phosphor screen is typically prepared in three separate stages. For example, a faceplate panel may first be provided with a systematic array of blue phosphor dots or areas; second, the panel is provided with a similar array of green phosphor areas; and third, the panel is provided with an array of red phosphor areas. The resulting combination is an array of phosphor triads, each triad consisting of a blue, a green, and a red phosphor area. A particularly useful combination is zinc sulfide as the blue phosphor, zinc and cadmium sulfides as the green phosphor, and yttrium ortho-vanadate (commonly called yttrium vanadate) activated with europium as the red phosphor.

In each stage of the operation an aqueous slurry of the powdered phosphor is spread upon the face panel by a centrifugal action obtained by spinning the faceplate panel. In addition to the phosphor, each slurry contains a photosensitized binder, such as polyvinyl alcohol sensitized with ammonium dichromate. The slurry-coated faceplate panel is dried and exposed to a predetermined pattern of actinic light. The exposed panel is then developed by washing to remove the unexposed areas of the phosphor coating.

Since the red phosphor is usually the last to be applied to the faceplate panel, and since the slurry is repeatedly recycled for reuse in the processing of successive faceplate panels on a production line basis, there is a gradual buildup of contamination consisting primarily of the blue and green phosphors. Once the concentration level of contaminants becomes excessive, the slurry must be diverted from the production line and processed to reclaim a purified red phosphor for reuse.

Previous efforts to reclaim the red phosphor have relied primarily upon a differential rate of attack by nitric acid upon a mixture of phosphors. That is, with careful control it is sometimes possible to dissolve the green and blue phosphors with nitric acid. However, a substantial proportion of the red phosphor is also inadvertently dissolved and therefore lost during the acid treatment. Moreover, the acid treatment has been completely unsuccessful in the effort to reclaim yttrium oxysulfide, which is a particularly desirable red phosphor.

THE INVENTION

It is an object of the invention to provide a process for reclaiming rare earth phosphors from contaminated slurries thereof used in the manufacture of color cathode ray tubes. It is a further object of the invention to recover or reclaim rare earth phosphors from "machine scrapings" salvaged from the walls of slurry processing equipment.

It is a further object of the invention to recover certain other phosphors, including silicates and tungstates, for example, from contaminated slurries and scraping resulting from the manufacture of phosphor screens.

The process of the invention yields a purified phosphor which is substantially free of contamination, and which preserves the original quality of the phosphor crystal. The present process provides substantially increased yields in the recovery of a large number of rare earth phosphors, including yttrium vanadate activated with europium; indium borate; yttrium oxide activated with europium, and yttrium borate activated with terbium. Particularly outstanding results are obtained with yttrium oxysulphide activated with europium ($Y_2O_5S:Eu$). No prior technique is known to be commercially successful in the recovery of the oxysulfide, due to the ease of its solubility in nitric acid. Examples of silicate phosphors which can be reclaimed in accordance with the process of the invention includes zinc silicate activated with manganese and calcium silicate activated with silver.

A primary feature of the invention is the high temperature reaction of the phosphor contaminants with potassium nitrate or sodium nitrate in order to volatilize the organic contaminants, e.g. polyvinyl alcohol, and to solubilize certain remaining contaminants, including any free sulphur which may be present. The sulphide contaminants are converted to a relatively large diameter particulate form, which permits their removal by filtration, for example. Most important, of course, is the fact that the nitrate does not attack the rare earth phosphor crystals, even at the high temperatures employed.

The invention is embodied in a method for reclaiming or purifying contaminated rare earth phosphors and certain other contaminated phosphors including primarily silicates and tungstates. Generally, the contaminants include organic binders such as polyvinyl alcohol, a photosensitizer such as ammonium dichromate, and one or more other phosphors including, for example, zinc sulfide and cadmium sulfide. The method includes the step of intimately mixing potassium nitrate or sodium nitrate with the contaminated phosphor and heating the mixture to at least 1000° F. for a time sufficient to oxidize or otherwise convert at least some portion to the contaminants, followed by one or more treating steps to separate the desired phosphor from the residual contaminants, which for the most part exist in modified form as the result of the nitrate reaction at elevated temperature.

The invention is further embodied in a method for reclaiming a contaminated phosphor which includes the steps of washing the contaminated phosphor with water at a temperature of at least 130° F. and a pH of about 2 to 6 to remove water soluble contaminants; then mixing the washed phosphor and remaining contaminants with sodium nitrate or potassium nitrate and heating the mixture to at least 1000° F. for a time sufficient to convert at least a portion of the contaminants to a more readily separable form; and then washing the residue with water to remove water soluble contaminants produced in the nitrate step; and, finally, filtering or otherwise separating the relatively coarse-granted particulate contaminants from the more finely divided phosphor to be reclaimed.

In a particular embodiment the phosphor to be reclaimed is the red phosphor $YVO_4$:Eu, which normally contains polyvinyl alcohol and ammonium dichromate in deionized water, and which has become further contaminated with blue and green phosphors (cadmium sulfide and zinc sulfide). Initially, the sludge, to which machine scrapings have been added, is subjected to a series of hot water washing steps. The pH of the wash water is maintained between about 2 and 6, preferably between about 2 and 3, while the temperature is maintained above 130° F. and, preferably, above 175° F.

Best results are obtained by using a batch process washing technique, with agitation, each wash step lasting for at least one-half hour. Settling time between wash steps should also be extended to a full half hour and preferably one full hour. At least three stages of washing are required, with settling and decantation of the liquor phase after each wash step. Since decantation usually fails to achieve complete separation, the liquor from each decantation is centrifuged to recover entrained solids.

As many as five washing stages are sometimes required for best results. The temperature of the initial stage or stages is maintained at about 180° F., and any subsequent stage or stages may be maintained somewhat cooler. The higher temperatures give maximum solubility of the water soluble contaminants, while the subsequent stages are conveniently operated at a lower temperature to shorten the time required.

The adjustment of pH during the wash operation is generally required since operation above a pH of 6 greatly reduces the settling rate, whereas a pH below 2 becomes sufficiently acid that a risk may be incurred of dissolving a substantial portion of the red phosphor. Also, a pH below 2 tends to change the color of the solution and thereby interfere with a visual analysis and control of the process.

After the washing, settling, decantation and centrifuging steps, the washed solids are redispersed in deionized water and the suspension is pumped through a 10-mesh screen, for example, in order to separate larger particles from the phosphor, which readily passes through the screen. The suspension is then centrifuged to prepare a dewatered solids cake for the nitrate pyrolysis step.

The dewatered solids are then placed in stainless steel pans and thoroughly mixed with a substantially saturated aqueous solution of alkali metal nitrate. Less concentrated solutions may be used if desired. The use of a dry mixture is also possible, but with less effective results. Approximately 3 to 12 pounds of the nitrate salt are required, and preferably 5 to 8 pounds, for each 100 pounds of dewatered solids treated. The nitrate and contaminated phosphor solids are dried at a temperature of 200° to 600° F. and then subjected to pyrolysis at a temperature of 1000° to 1300° F., and preferably 1100° to 1200° F., for a time of at least one-half hour and preferably 1 to 3 hours or more. During the pyrolysis step the organic contaminant (polyvinyl alcohol) is volatilized as carbon dioxide and water vapor, while any free sulphur and at least a portion of the sulfides are converted to water soluble potassium sulfide. Also produced in nitrate pyrolysis are potassium carbonate, potassium sulfate, potassium polysulfide, and ammonium carbonate.

Total residue from the pyrolysis step is subjected to a series of mildly acid water washes, similar to the initial washing operation, with settling and decantation and centrifuging after each washing stage. A pH of 2 to 6, preferably 2 to 3, is maintained as before; agitation is also employed to achieve thorough mixing, and a settling time of 15 minutes to one hour is generally preferred, although shorter times or longer times may be desirable in certain instances.

Three to five washing stages are generally required for best results. The washed and dewatered solids are then redispersed in deionized water, pumped through a 250-mesh stainless steel filter, for example, to remove relatively coarse particulate matter formed in the pyrolysis step, followed by centrifuging to dewater the purified reclaimed phosphor. The reclaimed phosphor may advantageously be dried at about 300° F. prior to storage or reuse.

DRAWING

The foregoing sequence of operations is illustrated diagrammatically in the attached drawing. Although a particular embodiment has been described in which machine scrapings are combined with a contaminated slurry for processing, it will be apparent that the scrapings may be separately treated, if desired. In that event, the scrapings are initially dispersed in water to form a slurry, and thereafter the sequence of steps is the same as for the contaminated slurry, or for the combination of slurry and scrapings as described above.

What is claimed is:

1. A method for reclaiming or purifying a contaminated phosphor selected from the group consisting of yttrium vanadate activated by europium, yttrium oxysulfide activated with europium, indium borate, yttrium oxide activated with europium, yttrium borate activated with terbium, wherein the contaminants include ammonium dichromate, polyvinyl alcohol and zinc and cadmium sulfides, the method comprising the steps of, mixing potassium nitrate or sodium nitrate with the contaminated phosphor and heating the mixture to at least 1000° F., and subsequently cooling the same.

2. The method as defined by claim 1 further comprising the steps of water washing the residue from said heating step and filtering the same to separate and recover the purified phosphor.

3. A method for reclaiming a contaminated rare earth phosphor selected from the group consisting of yttrium vanadate activated by europium, yttrium oxysulfide activated with europium, indium borate, yttrium oxide activated with europium, yttrium borate activated with terbium, zinc silicate activated with manganese, and calcium silicate activated with silver which comprises washing the phosphor with water at a temperature of at least 130° F. and a pH of about 2 to 6, mixing the washed phosphor with an oxidizing agent selected from the group consisting of sodium nitrate and potassium nitrate, heating the mixture to at least 1000° F. for a time sufficient to oxidize at least a portion of the contaminants, washing the residue of the heating step to remove water soluble products, and then filtering a slurry containing the water insoluble solids to remove particulate contaminants substantially coarser than the phosphor to be reclaimed.

4. A method as defined in claim 3 wherein the oxidizing agent is mixed with the washed phosphor in the form of an aqueous solution, followed by the steps of dehydration at a temperature of 200 to 600° F. and pyrolysis at a temperature of 1100 to 1200° F.

References Cited

UNITED STATES PATENTS 3,348,924  10/1967  Levine et al. _____ 23—312
3,420,860  1/1969   Ropp _____ 252—301.4
3,424,692  1/1969   Toma et al. _____ 252—301.4

TOBIAS E. LEVOW, Primary Examiner

R. D. EDMONDS, Assistant Examiner

U.S. Cl. X.R.

252—301.4; 117—33.5